April 16, 1963 H. C. KNIGHTS ET AL 3,085,958
GRAPHITE MODERATOR STRUCTURES FOR NUCLEAR REACTORS
Filed Oct. 31, 1958 6 Sheets-Sheet 1
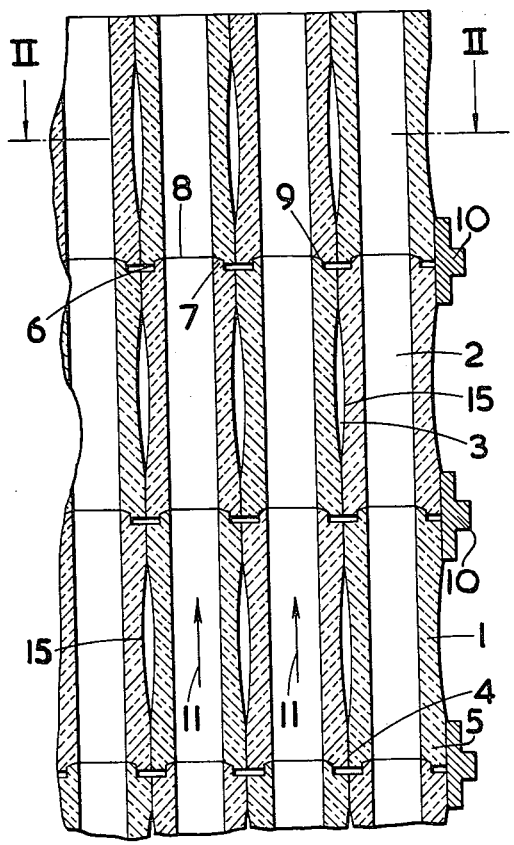
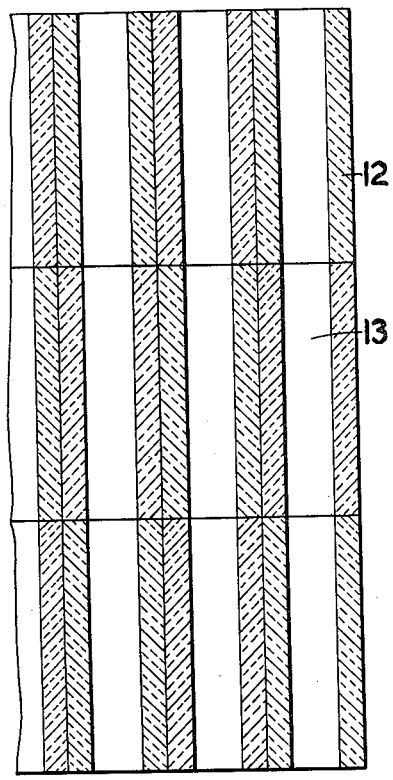
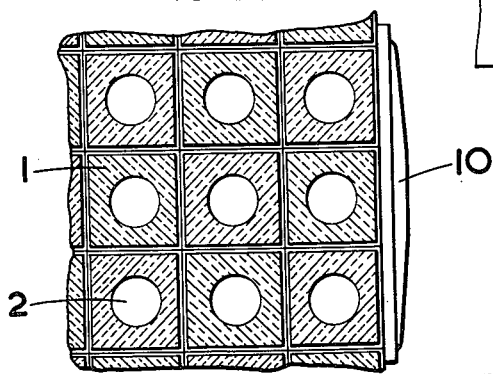
HERBERT CHILVERS KNIGHTS and
PETER NEIL MUNN - INVENTORS
By Larson and Taylor
Attorneys for Applicants HERBERT CHILVERS KNIGHTS and
PETER NEIL MUNN - INVENTORS Attorneys for Applicants

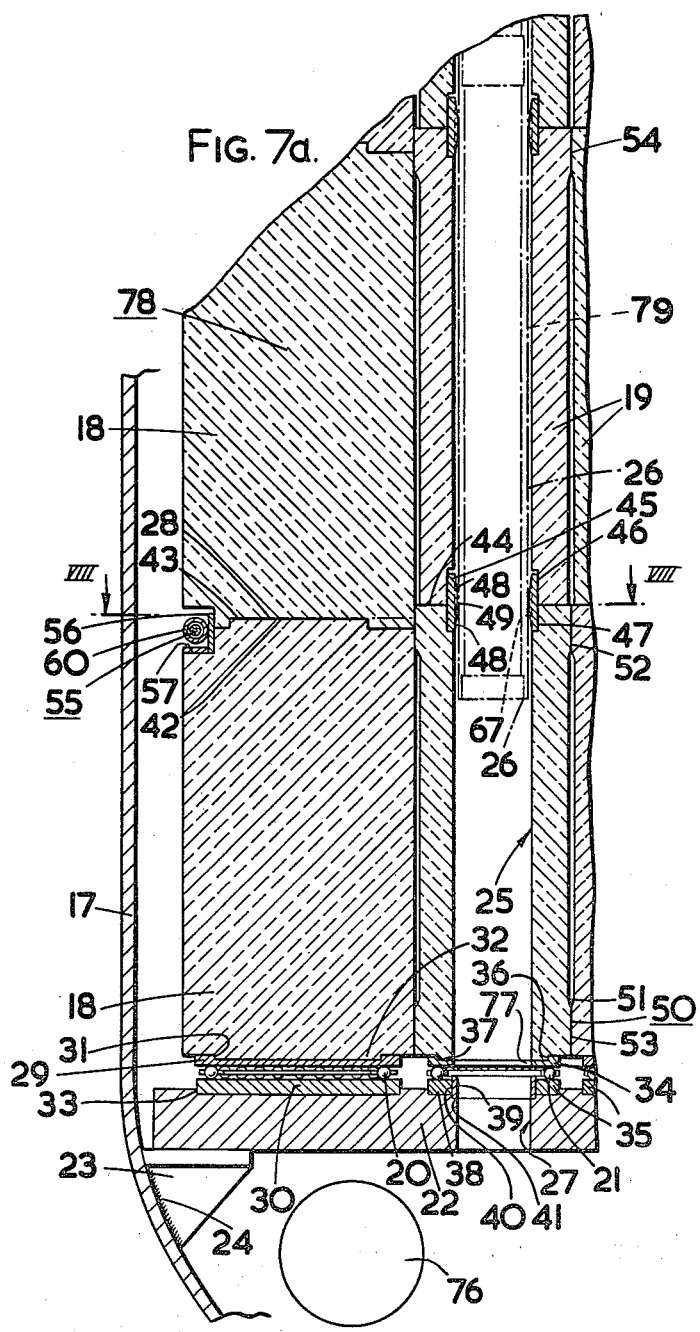

April 16, 1963    H. C. KNIGHTS ET AL    3,085,958
GRAPHITE MODERATOR STRUCTURES FOR NUCLEAR REACTORS
Filed Oct. 31, 1958    6 Sheets-Sheet 5
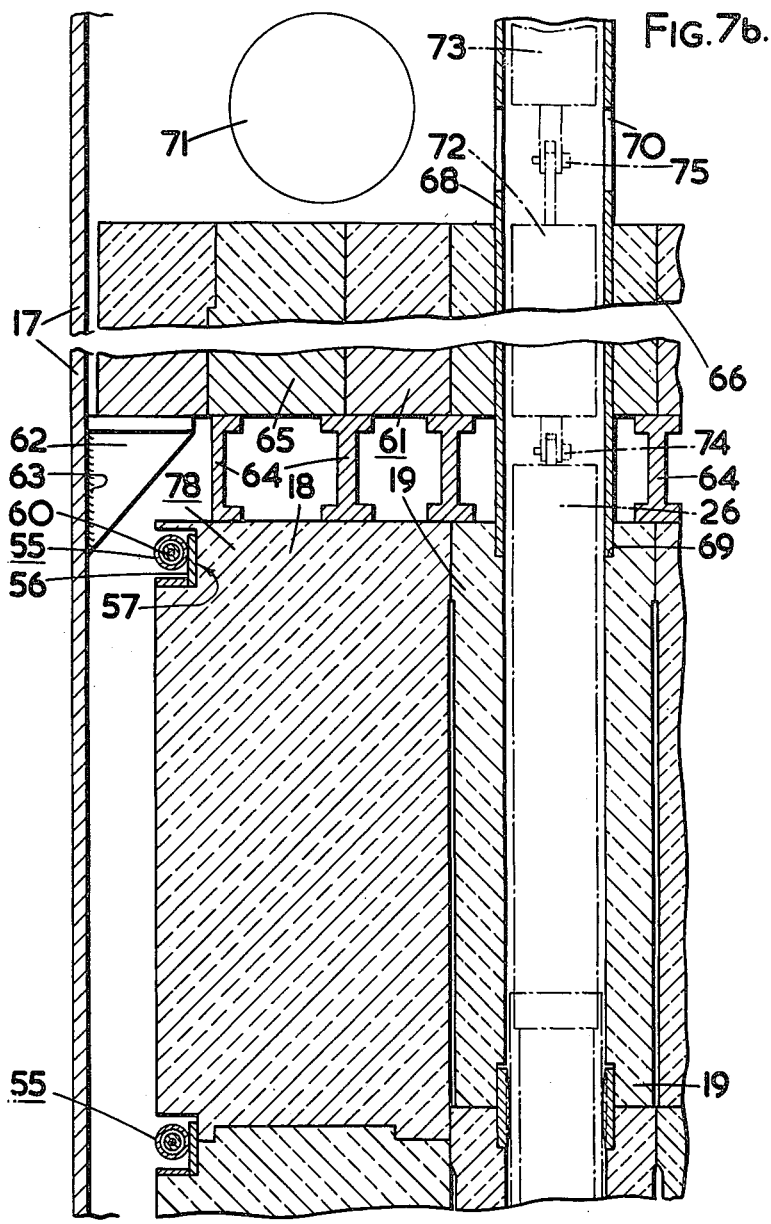
HERBERT CHILVERS KNIGHTS and
PETER NEIL MUNN - INVENTORS
Attorneys for Applicants

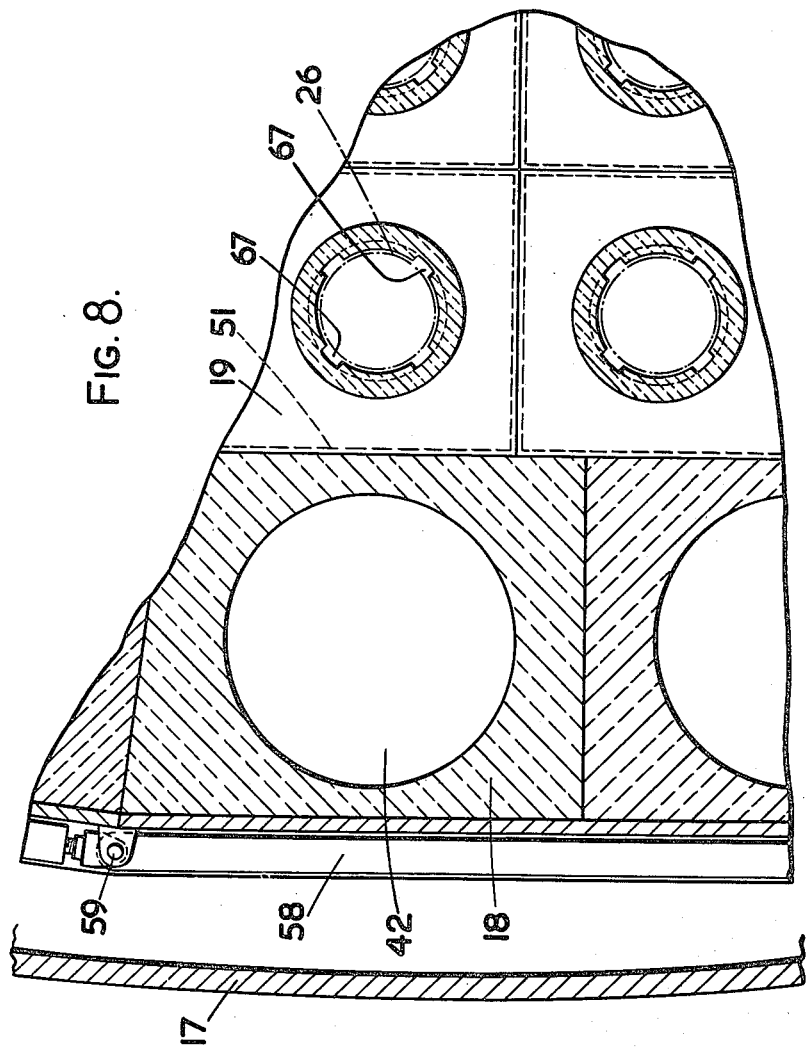

United States Patent Office 3,085,958
Patented Apr. 16, 1963

3,085,958
GRAPHITE MODERATOR STRUCTURES FOR NUCLEAR REACTORS
Herbert Chilvers Knights and Peter Neil Munn, Culcheth, near Warrington, England, assignors to United Kingdom Atomic Energy Authority, London, England
Filed Oct. 31, 1958, Ser. No. 771,043
8 Claims. (Cl. 204—193.2)

This invention relates to nuclear reactors and it is concerned with graphite moderator structures therefor.

In the conventional graphite moderated nuclear reactor the moderator structure fulfils multiple functions. In the first place it serves to moderate neutron energies down to thermal levels whereby a chain reaction can be maintained with natural or only slightly enriched uranium. In the second place it serves to locate the fissile fuel elements on a suitably spaced lattice, and thirdly it serves to define channels for coolant flow over the elements. For these last two functions the moderator structure must be physically stable and contain a minimum number of leakage paths for coolant from the fuel element channels, such paths representing wasted pumping power and temperature dilution of coolant gas emerging from the reactor.

It is customary that the graphite moderator structure is made from an assembly of graphite blocks and certain problems arise in such an assembly. These problems arise primarily from the necessity of maintaining physical stability of the moderator structure and integrity of the fuel element channels in the light of various factors. The most pertinent of these factors is the phenomenon of anisotropic growth (Wigner growth) of graphite attributable to the effects of irradiation whilst in the reactor. Other factors are those of thermal expansion and the forces (when gas cooling is used) across the graphite structure acting to displace the structure.

If it were not for this anisotropic growth of graphite under radiation it would be possible to construct a graphite moderator structure in the form of a simple stack of unspaced graphite blocks. However, such a structure is unsuitable, owing to the above mentioned growth of the graphite which would produce distortions in the structure with consequent misalignments in the fuel element channels and gaps in the structure breaking the continuity of the channels and allowing leakage of coolant from the channels.

Accordingly the current practice in the reactor construction spaces the graphite blocks of a graphite moderator structure apart so that growth can be accommodated without distorting the structure. This practice naturally fails to achieve greatest density of moderator, it causes neutron wastage by streaming along the spaces between the blocks and it allows undesirable flow of coolant in the spaces. The practice also complicates the manufacture, construction and assembly of the reactor.

It is an object of the invention to provide a graphite structure in the form of a simple stack of unspaced graphite blocks which does not create undesirable distortions under irradiation growth.

According to the invention a graphite moderator structure comprises a stack of graphite blocks defining fuel element channels passing end to end through the blocks and thereby through the structure characterized in that the side faces of the blocks are recessed along most of their length so that contact between the side faces occurs only over narrow contact bands at the ends of the blocks and the structure has centripetal restraint means acting at the planes of said contact bands.

One embodiment of the invention will now be described by way of example with reference to the drawings in which:

FIG. 1 is a longitudinal sectional elevation of a graphite moderator structure.

FIG. 2 is a sectional plan along the line II—II in FIG. 1.

FIG. 3 is a sectional elevation of an elemenetary form of "stacked block" graphite moderator structure which is introduced to assist in the description of the invention.

Figure 4:
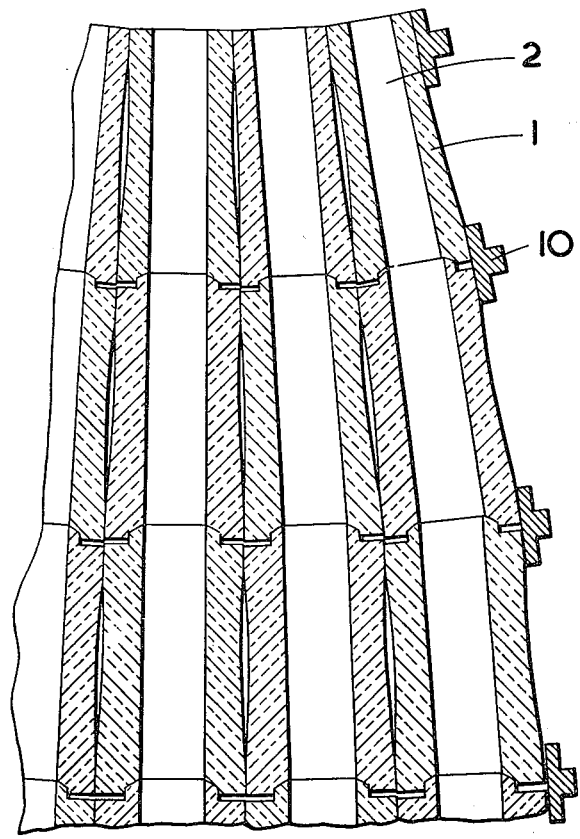
FIGS. 4 and 5 are longitudinal sectional elevations of the structures of FIGS. 1 and 3 after growth in transverse planes due to irradiation during use in a nuclear reactor.

FIGS. 7a and 7b together form a fragmentary elevation of a further modified moderator structure.

FIG. 8 is a section taken on the lines VIII—VIII of FIG. 7a.

Referring to FIGS. 1 and 2 the structure shown comprises a stack of graphite blocks 1. The blocks 1 which are of square cross section are in contact with each other on all faces and are longitudinally drilled to provide fuel element channels 2 passing end to end through the blocks and thereby through the structure. The blocks 1 have side faces 3 with recesses 15 so that contact between the blocks 1 at the faces 3 is limited to small bands 4 near the ends 5 of the blocks 1. The blocks 1 are also spigotted together at end faces 6, each block 1 having a spigot 7 and a socket 8. The spigots 7 have curved end faces 9 with a tolerance of .005 inch diametral allowing rocking of one block 1 on another and the sockets 8 are of complementary shape. The stability of the structure is maintained by centripetal restraint bands including restraint shoes 10 applying restraint forces to the structure, at the planes of the bands 4.

The blocks 1 are formed so that the direction of minimum growth under irradiation is in the same direction as the longitudinal axes of the blocks 1 as shown by the arrows 11 in FIG. 1.

Figure 5:
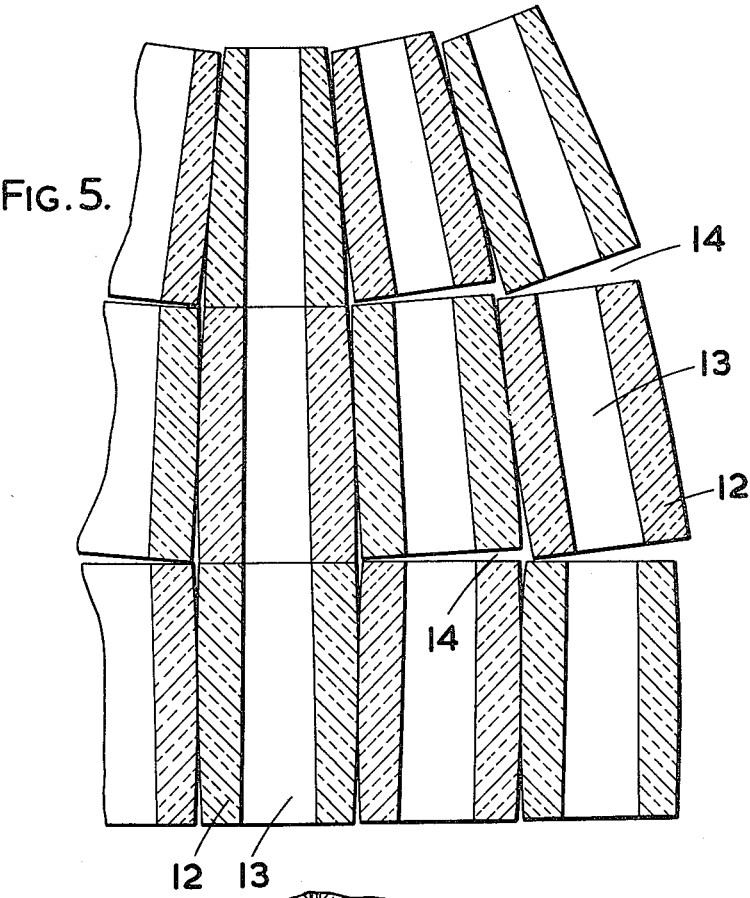

FIG. 3 shows a graphite moderator structure formed from an elementary stack of right prismatic blocks 12 of square cross section drilled to provide fuel element channels 13 passing end to end through the structure. Growth of the blocks 12 under irradiation during use in a nuclear reactor is non-uniform as a direct result of the non-uniform intensity of irradiation which occurs throughout the structure. The irradiation being normally greatest in the center and least at the edges of the structure giving rise to a barrel-shaped structure from an original cylindrical structure. This non-uniform growth of the blocks 12 gives rise to the configuration shown (in one exaggerated form) in FIG. 5 in which misalignments occur in the fuel element channels 13 and spaces 14 exist between the blocks 12 allowing leakage of coolant from the channels 13.

FIG. 4 shows the configuration taken by the structure of FIG. 1 (again exaggerated) after growth of the blocks 1 in transverse planes (i.e., the direction of maximum anisotropic growth) due to non-uniform irradiation during use in a nuclear reactor. (In FIGS. 4 and 5 the growth in the direction normal to the transverse plane has a minor effect and has not been taken into account in illustrating the major effect of transverse growth).

It will be seen that although the growth of the blocks 1 is again non-uniform and the channels 2 become curved the continuity and integrity of the channels 2 is unimpaired. The recesses 15, in FIG. 1 tend to close after prolonged irradiation but are arranged always to be slightly clear of the adjacent blocks 1 during their full life.

Figure 6:
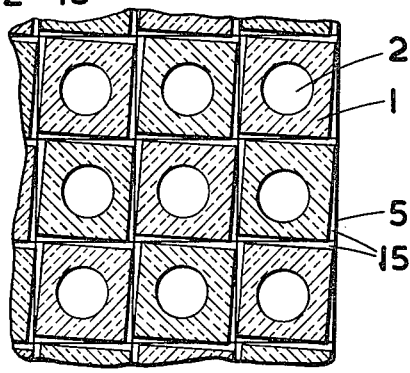
FIG. 6 is a sectional plan view (corresponding to the view shown in FIG. 2) of a modified form of graphite moderator structure according to the invention.

As a further feature the blocks 1 may be made of "twisted" cross section between their ends 5 as shown in FIG. 6 by cutting the recesses 15 to be wedge shaped. This arrangement prevents the streaming of neutrons which would otherwise occur along the straight channels formed by interconnection of the recesses 15 in the structure of FIG. 1.

Referring to FIGS. 7a, 7b and 8, (which are directed to the feature of face contact between the blocks on small bands at one end only of the blocks) a pressure vessel 17 of a gas cooled nuclear reactor houses a graphite moderator structure 78 formed by a stack of graphite blocks 18, 19, the structure being in plan view a twenty-four sided polygon. Blocks 18, 19 are supported by ball bearings 20, 21 respectively, the bearings being supported in turn by a steel base plate 22 carried by a number of equi-spaced brackets 23 welded to the vessel 17, at 24. The graphite blocks 18 are of solid form and comprise the side reflector part of the structure 78, bounding the inner mass of blocks 19 which are provided with vertical fuel element channels 25 for inter-connected sheathed fuel element clusters 26 (shown in dotted outline). The elements 26 are tubular in form. Holes 27 in the base plate 22 allow coolant gas admitted through inlets 76 in the lower end of the vessel 17 to flow upwards through channels 25 in blocks 19 and cool the fuel elements 26 within the channels.

Ball bearings 20, 21 allow expansion of the graphite blocks 18, 19 relative to the steel base plate 22 when the reactor is subjected to temperature changes. Ball bearings 20 are disposed between a pair of bearing plates 29, 30, plate 29 having a recess 31 into which a spigot 32 on the lower end of bottom block 18 is located, plate 30 being accommodated by a recess 33 in base plate 22. The ball bearings 21 are similarly disposed between a pair of bearing plates 34, 35, plate 34 having a recess 36 to accommodate a spigot 37 on the lower end of bottom block 19 and plate 35 being located within a recess 38 in the base plate 22. A hole 77 in plate 34 allows coolant gas to enter the lower end of the fuel element channel 25 within blocks 19. A hole 40 in plate 35 together with a recess 41 in base plate 22 locates a ring 39 provided to prevent ball bearings 21 from moving too near holes 27 in the event of excess expansion of the graphite structure 78.

A tolerance of .005 inch diametral exists between sleeve 45 and recesses 46, 47 to allow some relative movement between adjacent end faces of blocks 19.

The graphite blocks 18 are spigotted together at 28 by spigots 42 formed in the upper end faces of the blocks fitting into complementary sockets 43 in the lower end faces of the blocks. Blocks 19 are located together at 44 by sleeves 45 spigotted into opposite sockets 46, 47 in the upper and lower end faces respectively of the blocks. Sleeves 45 taper inwards from each end at 48 to form a parallel section 49, the section 49 providing a central location for the fuel elements 26 in addition to locating the end faces of blocks 19.

The diameter of the fuel elements 26 is less than the diameter of channels 25 thereby leaving an annular gap 79 between element and wall of channel to act as a heat insulating space to keep the temperature of the graphite higher than that of the coolant passing through the fuel elements and thereby avoid excessive storage of Wigner energy in the graphite. The sleeves 45 are provided with passageways 67 to allow movement of coolant between gaps 79. The side faces 50 of each block 19 are recessed at 51 to limit contact between each block to small bands near both ends 52, 53 of each block as in the bottom blocks of the structure 78 or to a single end 54 in the remaining blocks.

The graphite structure 78 formed by blocks 18, 19 is restrained by a series of elastic restraint bands 55 bearing on plates 56 within recesses 57 on the outer side faces of blocks 18 adjacent the contact area of blocks 18, 19. Each band 55 comprises a series of links 58 joined together by pin-joints 59, each link 58 consisting of a nest of co-axial tubes 60, arranged so that alternate tubes are subjected to equal tensile or compresive stresses, the tension in the links being transmitted as a centripetal load to the structure 78.

A shield structure 61 disposed above the moderator structure 78 is supported by a number of equi-spaced brackets 62 welded to the upper part of the pressure vessel 17 at 63, together with stools 64 bearing upon the top blocks 18, 19 of the structure 78. The structure 61 is formed by boron steel blocks 65, and graphite blocks 66. Charge tubes 68 communicate with the charge face of the reactor, passing through the pressure vessel 17 and the steel blocks 66 of the structure 61 to terminate in a recess 69 in the top blocks 19. Charge tubes 68 are provided with ports 70 and allow coolant gas flowing up fuel element channels 25 to pass through the reflector structure 61, leaving the pressure vessel 17 by way of outlet ducts 71. The fuel elements 26 are suspended, by way of an intermediate connecting number 72 (perforated to allow coolant flow) from a plug 73 disposed within the charge tube 68 and removable from the reactor charge face. The fuel elements 26 are attached to the intermediate member 72 by means of a pin joint 74, the member 72 in turn connected to the plug 73 by a similar pin joint 75.

We claim:

1. A graphite moderator structure comprising a stack of graphite blocks having their direction of minimum growth under irradiation along their longitudinal axes, the blocks having openings therethrough defining fuel element channels passing end to end through the blocks, the side faces of each of the blocks being recessed to provide relatively narrow end contact areas on said side faces between laterally adjacent blocks and relatively wide noncontacting areas on said side faces, and centripetal restraint means acting at the planes of the contact areas whereby upon growth of the graphite blocks under irradiation contact is maintained between adjacent blocks in said end contact areas and the openings through the stacked blocks remain in alignment.

2. A graphite moderator structure as claimed in claim 1 wherein each block has a contact area at both ends.

3. A graphite moderator structure as claimed in claim 1 wherein the planes of the faces of the contact areas are angularly displaced relative to the planes of the noncontacting areas of the side faces so as to reduce the length of clear passage for neutron streaming across the side faces.

4. A graphite moderator structure as claimed in claim 1 wherein, in a longitudinally adjacent line of blocks, the blocks of said line have means locating one with the other.

5. A graphite moderator structure as claimed in claim 4 wherein said means comprises a socket and spigot arrangement with a small clearance between socket and spigot allowing angular misalignment between the blocks of said line to a degree introduced by differing Wigner growth at various planes throughout the structure.

6. A graphite moderator structure as claimed in claim 4 wherein said means comprises a sleeve extending into adjacent openings of the blocks of said line, said sleeve having a small clearance allowing angular misalignment between blocks to a degree introduced by differing Wigner growth at various planes throughout the structure and also having an internal face tapered from both ends of the sleeve so as to reduce the diameter at the center of the sleeve to centralise tubular fuel elements in the fuel element channels in the blocks with a small annular gap between a tubular element and the surrounding channel walls.

7. A graphite moderator structure as claimed in claim 6 wherein said sleeve has passageways interconnecting the annular gap existing between a fuel element and the channel wall in one block with the annular gap existing between the fuel element and the channel wall of the next block of said line.

8. A graphite moderator structure comprising a stack of graphite blocks having their direction of minimum growth under irradiation along their longitudinal axes, the blocks having openings therethrough defining fuel element channels passing end to end through the blocks, the side faces at one end of each block being recessed to provide relatively narrow contact areas on said side faces between laterally adjacent blocks and relatively wide non-contacting areas on said side faces extending to the other end of said block, the blocks of said structure being disposed so that in a longitudinally adjacent line of blocks, the said one end of one block abuts the said other end of the next block in line and centripetal restraint means acting at the planes of the contact areas between the laterally adjacent blocks whereby upon growth of the graphite blocks under irradiation contact is maintained between adjacent blocks in said end contact areas and the openings through the stacked blocks remain in alignment.

References Cited in the file of this patent

UNITED STATES PATENTS

| | | |
|---|---|---|
| 1,115,266 | Wiltse | Oct. 27, 1914 |
| 1,682,360 | Straub | Aug. 28, 1928 |
| 2,422,461 | Erquette | June 17, 1947 |
| 2,852,457 | Long et al. | Sept. 16, 1958 |
| 2,863,815 | Moore et al. | Dec. 9, 1958 |
| 2,865,828 | Long et al. | Dec. 23, 1958 |